(12) United States Patent
Hiromatsu et al.

(10) Patent No.: US 12,332,339 B2
(45) Date of Patent: Jun. 17, 2025

(54) OBSTACLE DETECTION SYSTEM, OBSTACLE DETECTION METHOD, AND NON-TRANSITORY COMPUTER-READABLE RECORDING MEDIUM

(71) Applicant: Mitsubishi Electric Corporation, Tokyo (JP)

(72) Inventors: Kohei Hiromatsu, Tokyo (JP); Michinori Yoshida, Tokyo (JP); Yasushi Sugama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/766,821

(22) PCT Filed: Oct. 28, 2019

(86) PCT No.: PCT/JP2019/042200
§ 371 (c)(1),
(2) Date: Apr. 6, 2022

(87) PCT Pub. No.: WO2021/084583
PCT Pub. Date: May 6, 2021

(65) Prior Publication Data
US 2024/0085553 A1 Mar. 14, 2024

(51) Int. Cl.
*G01S 13/00* (2006.01)
*G01S 13/86* (2006.01)

(52) U.S. Cl.
CPC .................. *G01S 13/865* (2013.01)

(58) Field of Classification Search
CPC ...... G01S 13/865; G01S 17/89; G01S 7/4866; G01C 13/00–006
See application file for complete search history.

(56) References Cited

U.S. PATENT DOCUMENTS

2012/0070071 A1* 3/2012 Rankin .................. G06V 20/58
382/154
2016/0266247 A1* 9/2016 Hjelmstad ............... G01S 17/89
(Continued)

FOREIGN PATENT DOCUMENTS

CN 110275153 A * 9/2019 ............. G01S 17/58
JP 2011-169880 A 9/2011
(Continued)

OTHER PUBLICATIONS

L. Corgnati et al., "High resolution stereo imaging of sea waves for validation and optimization of wave modelling," Oceans 2015—Genova, Genova, Italy, 2015, pp. 1-8, doi: 10.1109/OCEANS-Genova.2015.7271382. (Year: 2015).*
(Continued)

*Primary Examiner* — Anne Marie Antonucci
*Assistant Examiner* — Jordan T Smith
(74) *Attorney, Agent, or Firm* — Sughrue Mion, PLLC (57) ABSTRACT

An obstacle detection device (3) receives information on observation point cloud data formed of a plurality of reflection points (14) observed within a measurement range including a water surface (10), and includes: a plane detection unit (31) to detect planes extending near the plurality of reflection points (14) included in the observation point cloud data; a pseudo water surface detection unit (32) to detect a pseudo water surface; a wave peak detection unit (34) to detect a reflection point (14) corresponding to a wave peak (16); and an obstacle detection unit (3e) to take the reflection points (14) corresponding to the pseudo water surface and the reflection point (14) corresponding to the wave peak (16), as reflection points (14) included in water surface point cloud data, and to determine a reflection point (14) not included in the water surface point cloud data, as a reflection point (14) of an obstacle.

10 Claims, 9 Drawing Sheets

(56) References Cited

U.S. PATENT DOCUMENTS

| | | | |
|---|---|---|---|
| 2017/0205829 A1* | 7/2017 | Tyers | ............... B63H 25/04 |
| 2018/0081056 A1 | 3/2018 | Ohtomo et al. | |

FOREIGN PATENT DOCUMENTS

| | | | |
|---|---|---|---|
| JP | 2012-237592 A | 12/2012 | |
| JP | 2013-205130 A | 10/2013 | |
| JP | 2016-206025 A | 12/2016 | |
| JP | 2018-044913 A | 3/2018 | |
| WO | 2014/192530 A1 | 12/2014 | |

OTHER PUBLICATIONS

J. Muhovič, R. Mandeljc, B. Bovcon, M. Kristan and J. Perš, "Obstacle Tracking for Unmanned Surface Vessels Using 3-D Point Cloud," in IEEE Journal of Oceanic Engineering, vol. 45, No. 3, pp. 786-798, Jul. 2020, doi: 10.1109/JOE.2019.2909507. (Year: 2019).*

Z. Chen and B. Gao, "An Object-Based Method for Urban Land Cover Classification Using Airborne Lidar Data," in IEEE Journal of Selected Topics in Applied Earth Observations and Remote Sensing, vol. 7, No. 10, pp. 4243-4254, Oct. 2014, doi: 10.1109/JSTARS.2014.2332337. (Year: 2014).*

Kabel, Thomas & Georgakis, Christos & Zeeberg, Allan. (2019). Mapping Ocean Waves using LIDAR Technology. (Year: 2019).*

F. Yang, D. Su, Y. Ma, C. Feng, A. Yang and M. Wang, "Refraction Correction of Airborne LiDAR Bathymetry Based on Sea Surface Profile and Ray Tracing," in IEEE Transactions on Geoscience and Remote Sensing, vol. 55, No. 11, pp. 6141-6149, Nov. 2017, doi: 10.1109/TGRS.2017.2721442. (Year: 2017).*

Machine Translation of CN110275153A (Year: 2019).*

International Search Report for PCT/JP2019/042200 dated, Jan. 7, 2020 (PCT/ISA/210).

* cited by examiner

OBSTACLE DETECTION SYSTEM, OBSTACLE DETECTION METHOD, AND NON-TRANSITORY COMPUTER-READABLE RECORDING MEDIUM

CROSS REFERENCE TO RELATED APPLICATIONS

This application is a National Stage of International Application No. PCT/JP2019/042200 filed Oct. 28, 2019.

TECHNICAL FIELD

The present invention relates to an obstacle detection device, an obstacle detection method, and an obstacle detection program.

BACKGROUND ART

A three-dimensional Light Detection and Ringing (LiDAR) is sometimes used to detect an object such as a vessel and a pier on the water.

The LiDAR can determine a distance to the object by emitting laser light and measuring a time taken until reflected light from the object is received.

A three-dimensional LiDAR emits laser light in a plurality of directions such as upward, downward, rightward, and leftward directions to obtain a distance to an object, so that a three-dimensional position of the object can be generated as point cloud data on the basis of the thus-obtained distance and a laser emission angle.

The three-dimensional LiDAR can receive reflected light having an intensity equal to or larger than a fixed value. Accordingly, with the three-dimensional LiDAR, not only a vessel, a pier, and the like are detected, but depending on an incident angle, a water surface status, and the like, a water surface is sometimes detected as an object erroneously.

As a method of preventing a water surface from being erroneously detected as an object, Patent Literature 1 proposes a method of taking an assumed maximum wave height as an upper limit value and removing data indicating a height equal to or lower than the upper limit value from point cloud data.

CITATION LIST

Patent Literature

Patent Literature 1: JP 2012-237592 A

SUMMARY OF INVENTION

Technical Problem

The technique of Patent Literature 1 is intended for a three-dimensional LiDAR that generates point cloud data which is obtained by laser light scanning in the vertical direction within a measurement range. Therefore, sometimes it is not possible to use point cloud data generated by a three-dimensional LiDAR, a depth camera, or the like that generates point cloud data in accordance with a different method.

Further, the technique of Patent Literature 1 rests on a premise that the assumed maximum wave height is sufficiently smaller than a height of a vessel or the like to be detected. Hence, when a difference between the assumed maximum wave height and a height of a detection target is small, it may not be possible to detect most part of the detection target, or to detect the detection target.

An objective of the present invention is, in detecting an obstacle on a water surface, to detect a detection target that does not have a sufficient height with respect to an assumed wave height, regardless of how point cloud data is generated.

Solution to Problem

An obstacle detection device according to the present invention receives information on observation point cloud data formed of a plurality of reflection points observed within a measurement range including a water surface, the information including position information of each reflection point, and includes: a plane detection unit to detect planes extending near a plurality of reflection points included in the observation point cloud data;
  a pseudo water surface detection unit to detect a pseudo water surface which is a plane detected by the plane detection unit and extending through a relatively low portion of the water surface;
  a wave peak detection unit to detect a reflection point corresponding to a wave peak, from upper point cloud data, the wave peak being formed of the water surface excluding a relatively low portion of a wave of the water surface, the upper point cloud data being formed of reflection points obtained by removing reflection points corresponding to the pseudo water surface from the reflection points included in the observation point cloud data; and
  an obstacle detection unit to take the reflection points corresponding to the pseudo water surface and the reflection point corresponding to the wave peak, as reflection points included in water surface point cloud data, and to determine a reflection point included in the observation point cloud data and not included in the water surface point cloud data, as a reflection point of an obstacle.

Advantageous Effects of Invention

According to the present invention, a pseudo water surface detection unit detects a pseudo water surface, and a wave peak detection unit detects a wave peak, so that observation point cloud data can be separated into data acquired from a water surface and the other data. Thus, a detection target that does not have a sufficient height with respect to an assumed wave height can be acquired.

DESCRIPTION OF EMBODIMENTS

Embodiment 1

A present embodiment will be described in detail with referring to drawings.

Description of Configurations

An obstacle detection device 3 according to the present embodiment will be described with referring to the drawings.

Figure 1:
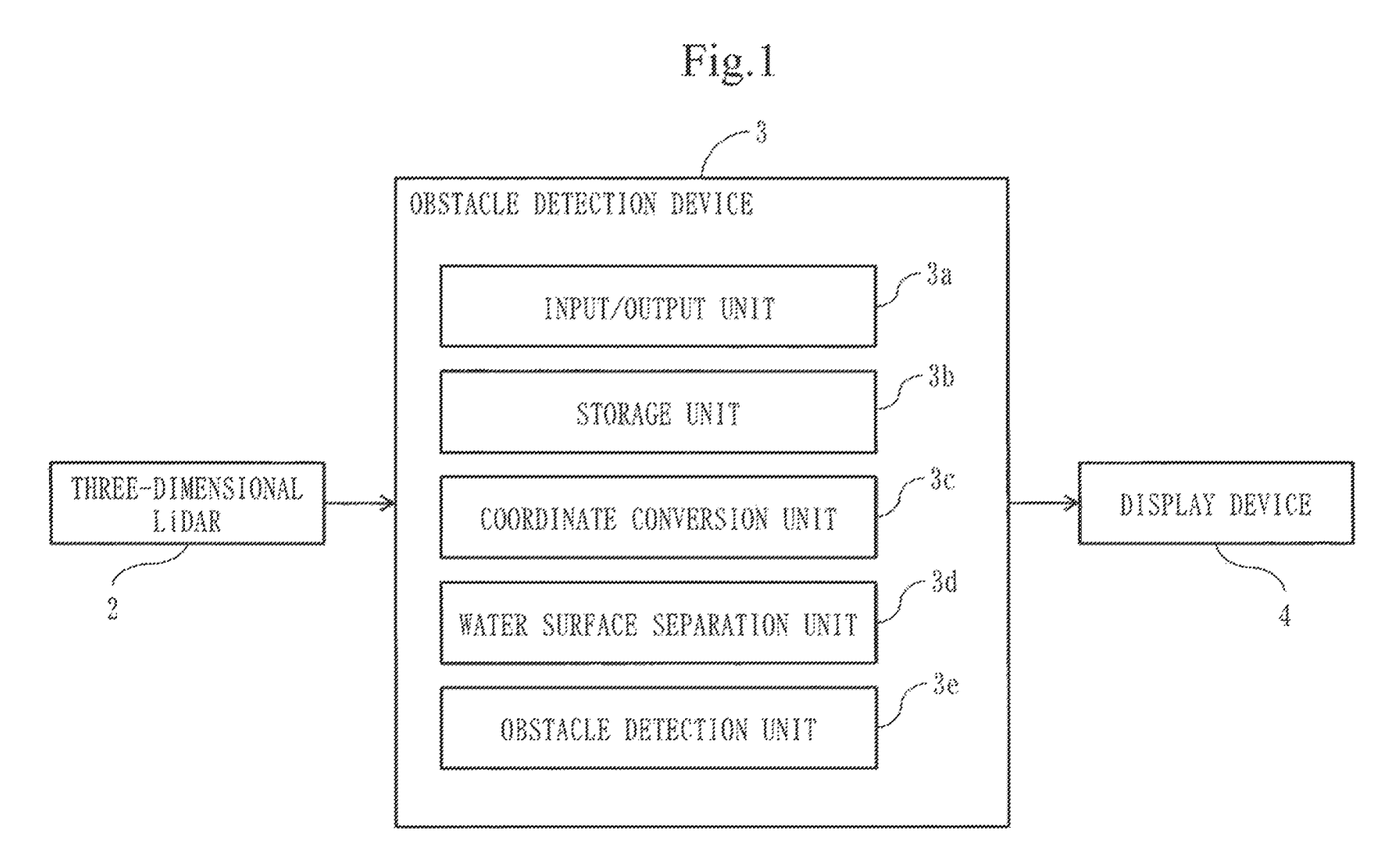
FIG. 1 is a configuration diagram of an obstacle detection system 1 provided with an obstacle detection device 3 according to Embodiment 1.

FIG. 1 illustrates an outline of a configuration example of an obstacle detection system 1 provided with the obstacle detection device 3 according to the present embodiment.

As illustrated in FIG. 1, the obstacle detection system 1 is provided with a three-dimensional Light Detection and Ranging (LiDAR) 2, the obstacle detection device 3, and a display device 4.

The three-dimensional LiDAR 2 radiates laser light, receives reflected light from an object, and outputs three-dimensional point cloud data collectively representing three-dimensional position information of reflection points 14. That is, the three-dimensional LiDAR 2 outputs information including position information of the reflection points 14.

The reflection point 14 is a point that expresses a surface of an object. When the obstacle detection system 1 is provided with the three-dimensional LiDAR 2, the reflection point 14 is a point at which the object has reflected laser light. The reflection point 14 may also be expressed as "point" hereinafter.

Figure 2:
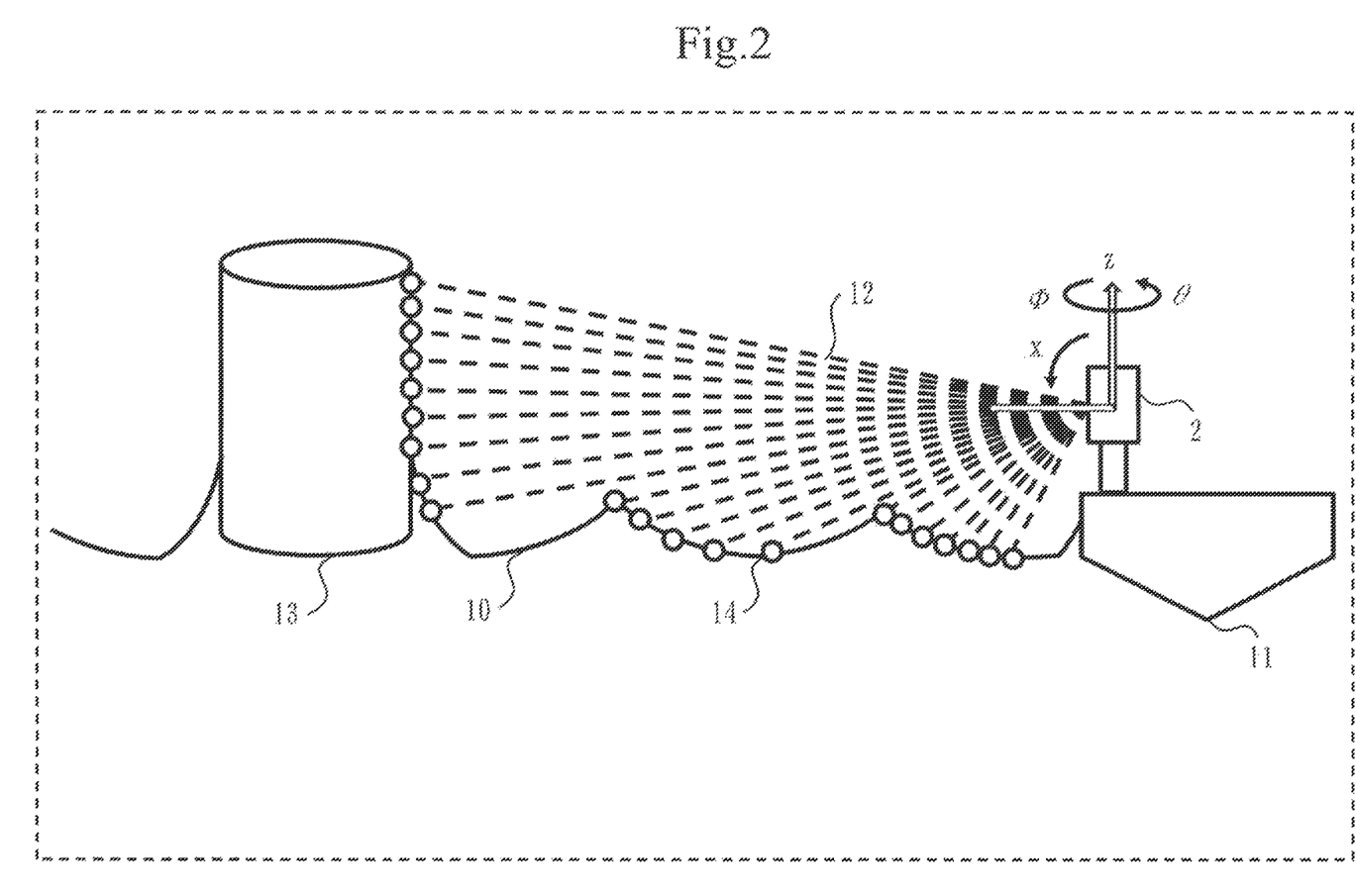
FIG. 2 is a side view schematically illustrating an example of data acquisition by a three-dimensional LiDAR 2.

The three-dimensional LiDAR 2
is installed on a floating body 1I such that a measurement range includes a water surface 10,
has a laser light-emitting unit, a laser light-receiving unit, and a driving unit (none is illustrated) which changes orientations of the laser light-emitting unit and the laser light-receiving unit vertically and horizontally,
emits laser light 12 a plurality of times while changing an emitting direction,
measures a time taken until the laser light 12 hitting reflection points 14 of the water surface 10 or an obstacle 13 within the measurement range and returning to the laser light-receiving unit as reflected light is detected, and
measures, for each reflection point 14, a distance R to the reflection point 14 and a reflection intensity I which is an intensity of the reflected light.

The water surface 10 is typically a boundary surface between liquid and gas.

The reflection intensity is synonymous with reflectance.

FIG. 2 is aside view schematically illustrating an example of data acquisition by the three-dimensional LiDAR 2.

Referring to FIG. 2, the floating body 11 is not fixed to but floats on the water surface 10.

Note that in a right-hand local coordinate system whose origin is the laser light-receiving unit of the three-dimensional LiDAR 2, an angle in the vertical direction and an angle in the horizontal direction are expressed as $\phi$ and $\theta$, respectively.

A z-direction of the local coordinate system of the three-dimensional LiDAR 2 is a height direction. Typically, when the floating body 11 is set on the water surface having no waves, the z-direction is a vertical direction and depends on a tilt of the floating body 11.

The three-dimensional LiDAR 2
scans the measurement range with a determined resolution,
takes a range to scan within a certain period of time as one frame,
measures the distance R and intensity I of each reflection point 14 included in one frame, and
outputs the distance R, the intensity I, and $\phi$ and $\theta$ to the obstacle detection device 3.

The measurement range is at least part of a range where the three-dimensional LiDAR 2 can measure.

The obstacle detection device 3
has an input/output unit 3a, a storage unit 3b, a coordinate transformation unit 3c, a water surface separation unit 3d, and an obstacle detection unit 3e,
detects an object on the basis of the three-dimensional point cloud data, and
outputs information of the detected object.

In a specific example, the input/output unit 3a has a digital input/output function, an analog input/output function, and/or a communication input/output function, takes, as input, data from the three-dimensional LiDAR 2, and outputs a computation result of the obstacle detection unit 3e to the display device 4.

The storage unit 3b stores threshold values and/or fitting-purpose model data and so on to be used by the coordinate transformation unit 3c, water surface separation unit 3d, and obstacle detection unit 3e.

The coordinate conversion unit 3c calculates three-dimensional point data $P(k) = (X(k)\ Y(k)\ Z(k)\ I(k))^T$ of the three-dimensional LiDAR 2 in the local coordinate system, from data $D(k) = (R(k)\ \phi(k)\ \theta(k)\ I(k))^T (1 \le k \le N)$ where N is a number of reflection points 14 included in one frame) of one-frame reflection points 14 acquired by the three-dimensional LiDAR 2, with using (Expression 1), (Expression 2), and (Expression 3). Note that I(k) is a reflection intensity and need not be computed. Part or whole of D(k) is sometimes called observation point cloud data.

$$X(k) = R(k) \sin\phi(k) \cos\theta(k) \quad \text{(Expression 1)}$$

$$Y(k) = R(k) \sin\phi(k) \sin\theta(k) \quad \text{(Expression 2)}$$

$$Z(k) = R(k) \cos\phi(k) \quad \text{(Expression 3)}$$

The water surface separation unit 3d
takes, as input, point cloud data $P (= \{P(1), \ldots, P(N)\})$ consisting of all 3-dimensional point data calculated by the coordinate transformation unit 3c, and
separates P into point cloud data $P_w$ formed of reflection points 14 on the water surface 10 and point cloud data $P_o$ formed of reflection points 14 on the obstacle 13, and outputs the point cloud data $P_W$ and the point cloud data $P_o$. $P_w$ is sometimes called water surface point cloud data.

Unless otherwise noted, in the description of the present embodiment, mentioning all points in a certain area is merely mentioning them as a typical example. Instead of all points in the certain area, some points in the certain area may be mentioned.

Figure 3:
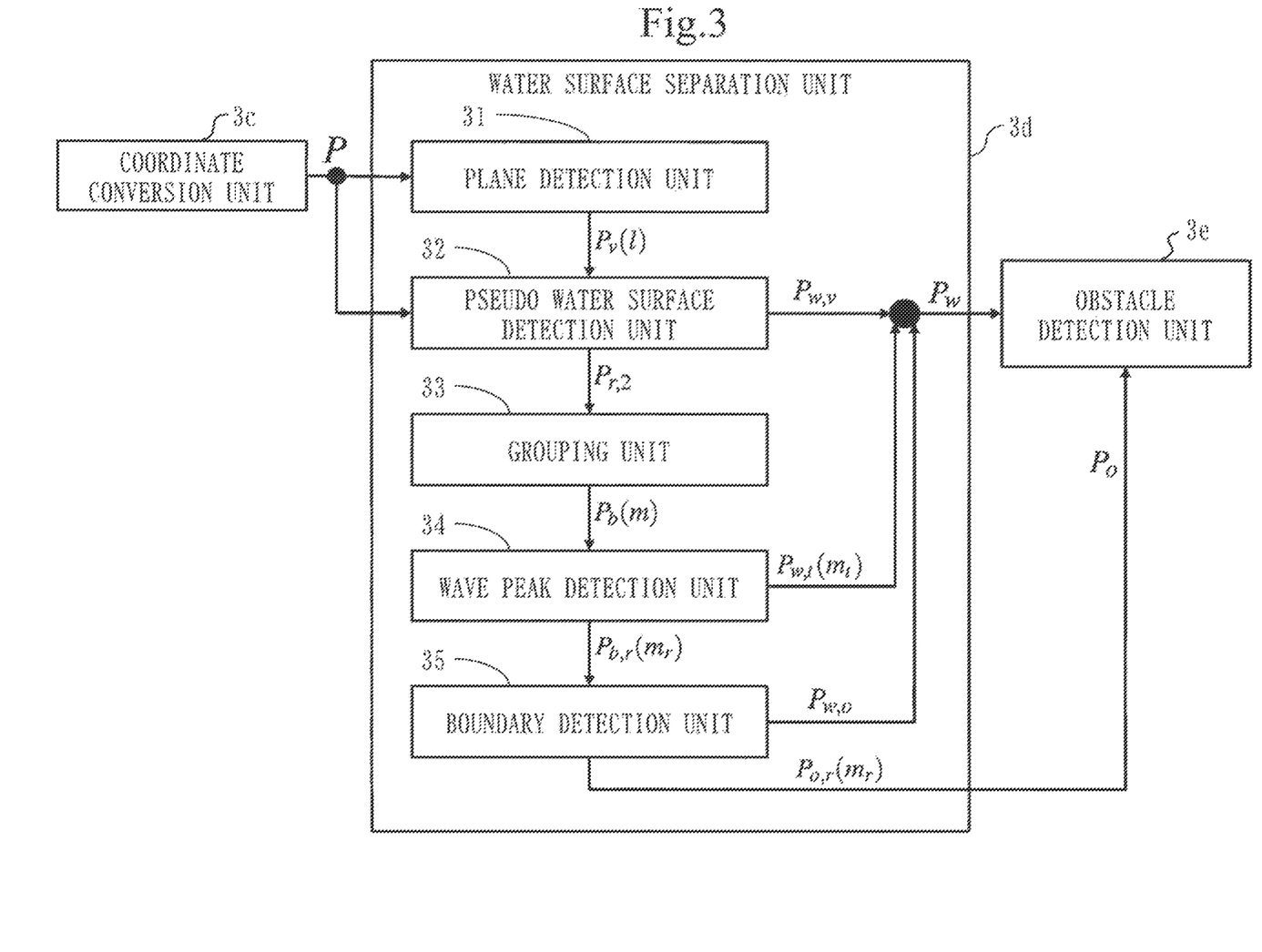
FIG. 3 is a configuration diagram of a water surface separation unit 3d according to Embodiment 1.

FIG. 3 is a diagram illustrating a configuration example of the water surface separation unit 3d and a data flow example.

As illustrated in FIG. 3, the water surface separation unit 3d is constituted of a plane detection unit 31, a pseudo water surface detection unit 32, a grouping unit 33, a wave peak detection unit 34, and a boundary detection unit 35.

In describing operations, data flow of the water surface separation unit 3d will be described.

Figure 4:
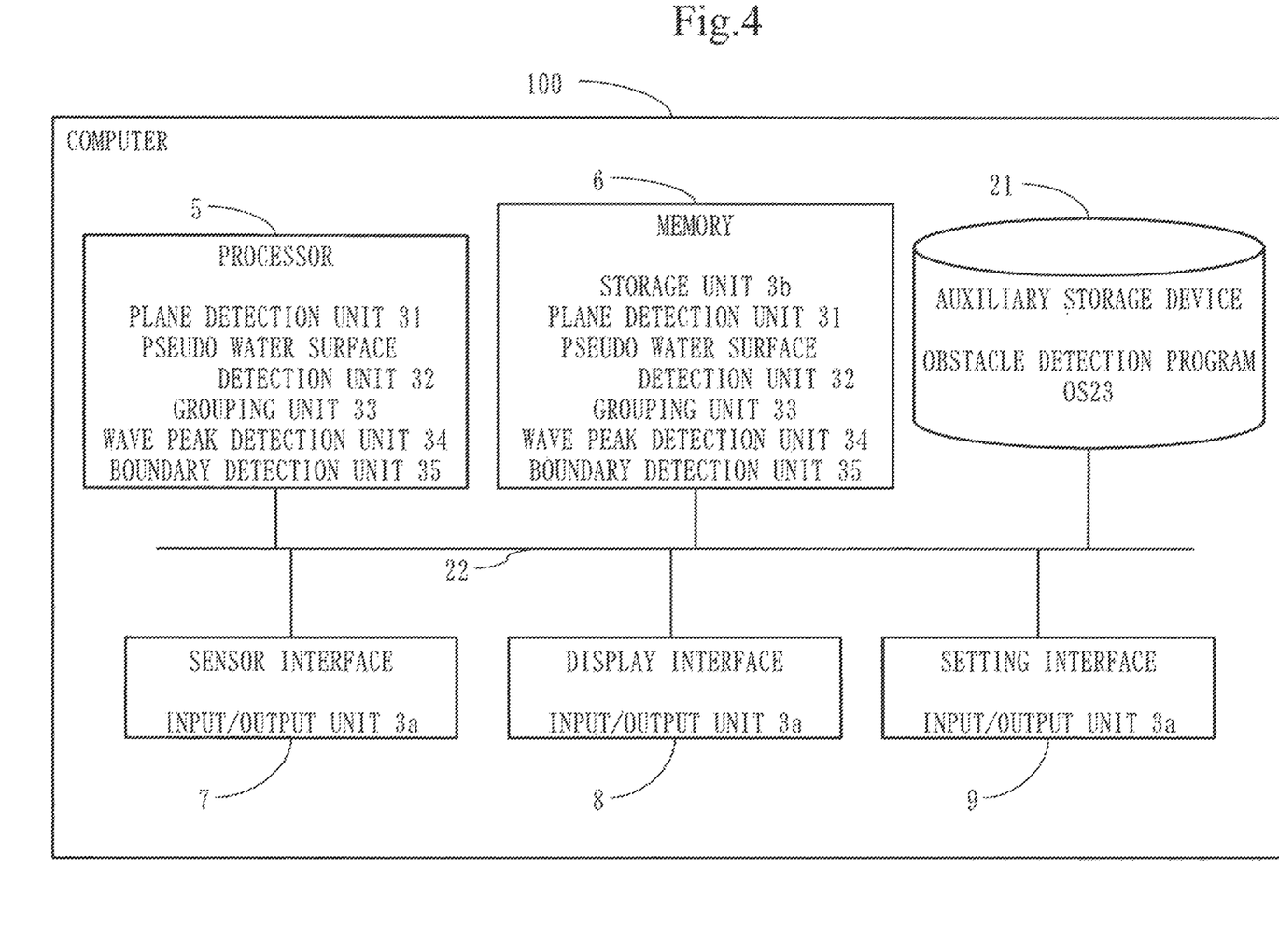
FIG. 4 is a hardware configuration diagram of the obstacle detection device 3 according to Embodiment 1.

FIG. 4 illustrates a hardware configuration example of the obstacle detection device 3. The obstacle detection device 3 is formed of a general computer 100.

A processor 5 is a processing device that runs an obstacle detection program, an Operating System (OS) 23, and so on. The processing device is sometimes called an Integrated Circuit (IC). Specific examples of the processor 5 include a Central Processing Unit (CPU), a Digital Signal Processor (DSP), and a Graphics Processing Unit (CPU).

The processor 5 is connected to a memory 6 via a data bus 22, performs temporary storage of data necessary for computation and/or data saving, and reads a program stored in the memory 6 and runs the program.

The obstacle detection device 3 of FIG. 4 is provided with only one processor 5. However, the obstacle detection device 3 may be provided with a plurality of processors that substitute for the processor 5. The plurality of processors share running of the program and so on.

The memory 6 is a storage device to store data temporarily and can keep a computation result of the processor 5. The memory 6 functions as a main memory used as a work area of the processor 5. The memory 6 corresponds to the storage unit 3b, and can store processes of the water surface separation unit 3d, obstacle detection unit 3e, and so on, and setting information from the display device 4. The processes stored in the memory 6 are developed on the processor 5.

A specific example of the memory 6 is a Random-Access Memory (RAM) such as a Static Random-Access Memory (SRAM) and a Dynamic Random-Access Memory (DRAM).

The storage unit 3b may be formed of an auxiliary storage device 21 at least partly.

The auxiliary storage device 21 stores the obstacle detection program, programs run by the processor 5, data to be used when running the programs, and so on. A specific example of the auxiliary storage device 21 is a Hard Disk Drive (HDD) or a Solid-State Drive (SSD). The auxiliary storage device 21 may be a portable recording medium such as a memory card, a Secure Digital (registered trademark; SD) memory card, a Compact Flash (CF), a NAND flash, a flexible disk, an optical disk, a compact disk, a Blu-ray (registered trademark) Disc, and a Digital Versatile Disk (DVD).

A sensor interface 7, a display interface 8, and a setting interface 9 correspond to the input/output unit 3a of the obstacle detection device 3, and their specific examples are an Ethernet (registered trademark) port or a Universal Serial Bus (USB) port.

The sensor interface 7 accepts information from the three-dimensional LiDAR 2. The display interface 8 and the setting interface 9 can communicate with the display device 4.

The sensor interface 7, the display interface 8, and the setting interface 9 may be formed of one port.

The OS 23 is loaded from the auxiliary storage device 21 by the processor 5, is developed on the memory 6, and runs on the processor 5. The OS 23 may be of any type that matches the processor 5.

The OS 23 and the obstacle detection program may be stored in the memory 6.

The obstacle detection program may be provided as a program product.

The display device 4
is provided with an input/output unit 4a, an operation unit 4b, and a display unit 4c.
displays detected object information coming from the obstacle detection device 3, and
typically, outputs setting information being set by the human being to the obstacle detection device 3.

The input/output unit 4a
has, in a specific example, a digital input/output function, an analog input/output function, and/or a communication input/output function,
takes as input a computation result of the obstacle detection unit 3e, and
outputs a setting value being set by the operation unit 4b (to be described later) so as to be stored in the storage unit 3b.

The operation unit 4b is, in a specific example, a keyboard, and allows a human being to perform an operation to change a display content of the display unit 4c, the setting value stored in the storage unit 3b, and so on.

The display unit 4c is, in a specific example, a liquid-crystal display, and can display a position, a speed, and/or a type and the like of a nearby obstacle 13 on the basis of the computation result of the obstacle detection unit 3e.

Description of Operations

An operation procedure of the obstacle detection device 3 corresponds to an obstacle detection method. A program that implements operations of the obstacle detection device 3 corresponds to the obstacle detection program.

Figure 5:
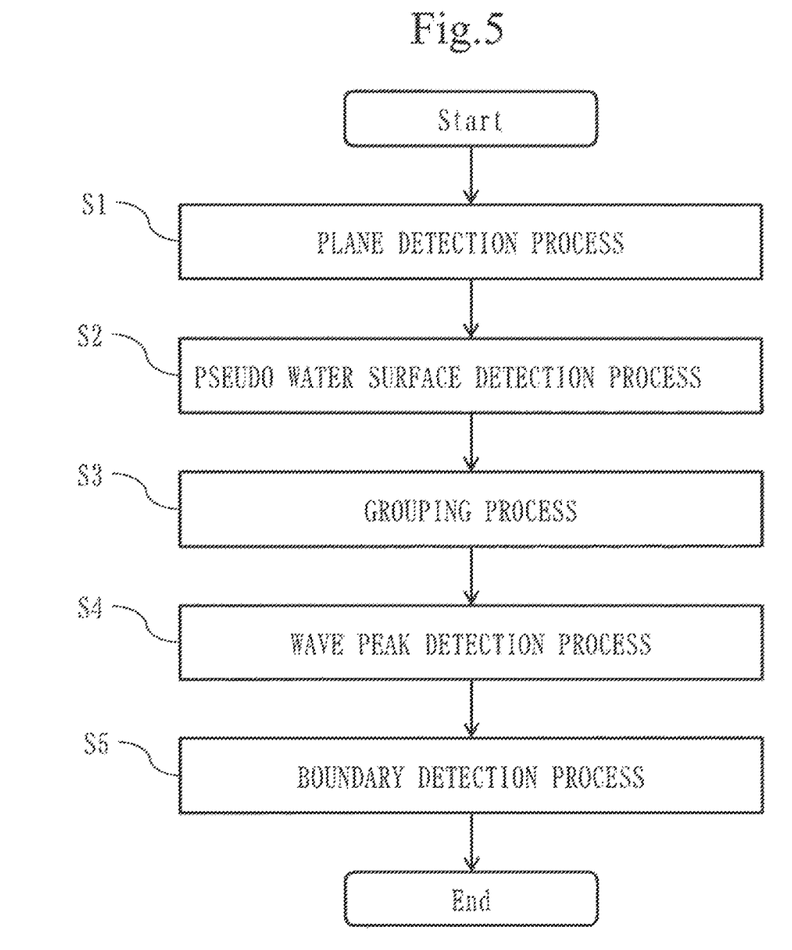
FIG. 5 is a flowchart illustrating operations of the water surface separation unit 3d according to Embodiment 1.

FIG. 5 is an example of a flowchart that illustrates operations of the water surface separation unit 3d. For the water surface separation unit 3d, an order of processes illustrated in this flowchart may be changed as necessary.

(Step S1: Plane Detection Process)

The plane detection unit 31 detects a plane by utilizing fitting to a plane model, and generates point cloud data by utilizing the detected plane.

The plane detection unit 31 selects a maximum of K pieces of points belonging to a vicinity of a certain plane from the point cloud data P, and generates point cloud data $P_v(1)$ ($1 \le 1 \le I_{MAX}$ where $I_{MAX}$ is an upper-limit number of planes to be detected by the plane detection unit 31).

K and $I_{MAX}$ may take any value.

The plane model is expressed with using four parameters a, b, c, and d, as indicated by an equation (Expression 4).

$$ax+by+cz+d=0 \text{ where } \sqrt{(a^2+b^2+c^2)}=1 \qquad \text{(Expression 4)}$$

The plane detection unit 31
detects a plane extending near the plurality of reflection points 14,
may use any scheme for plane detection, and
when Random Sample Consensus (RANSAC) is used, may use a definition indicated by (Expression 5) or another definition, as a definition of a distance L(k) between P(k) and the obtained plane model.

In the following, when mentioning a distance, a definition of the distance may be anything unless otherwise noted.

$$L(k)=|aX(k)+bY(k)+cZ(k)+d| \qquad \text{(Expression 5)}$$

The plane detection unit 31 typically uses, for plane detection, point cloud data $P_{r,1}$ obtained by removing, from P, all points selected as points belonging to the vicinity of an already existing plane so that the same point does not belong to $P_v(l_1)$ ($1 \le l_1 \le l_{MAX}$) and $P_v(l_2)$ ($1 \le l_2 \le l_{MAX}$, $l_1 \ne l_2$).

The plane detection unit 31 advances to step S2 when a total number of points belonging to the point cloud data $P_{r,1}$ reaches less than 3, or when $l_{MAX}$ pieces of planes are detected.

(Step S2: Pseudo Water Surface Detection Process)

Figure 6:
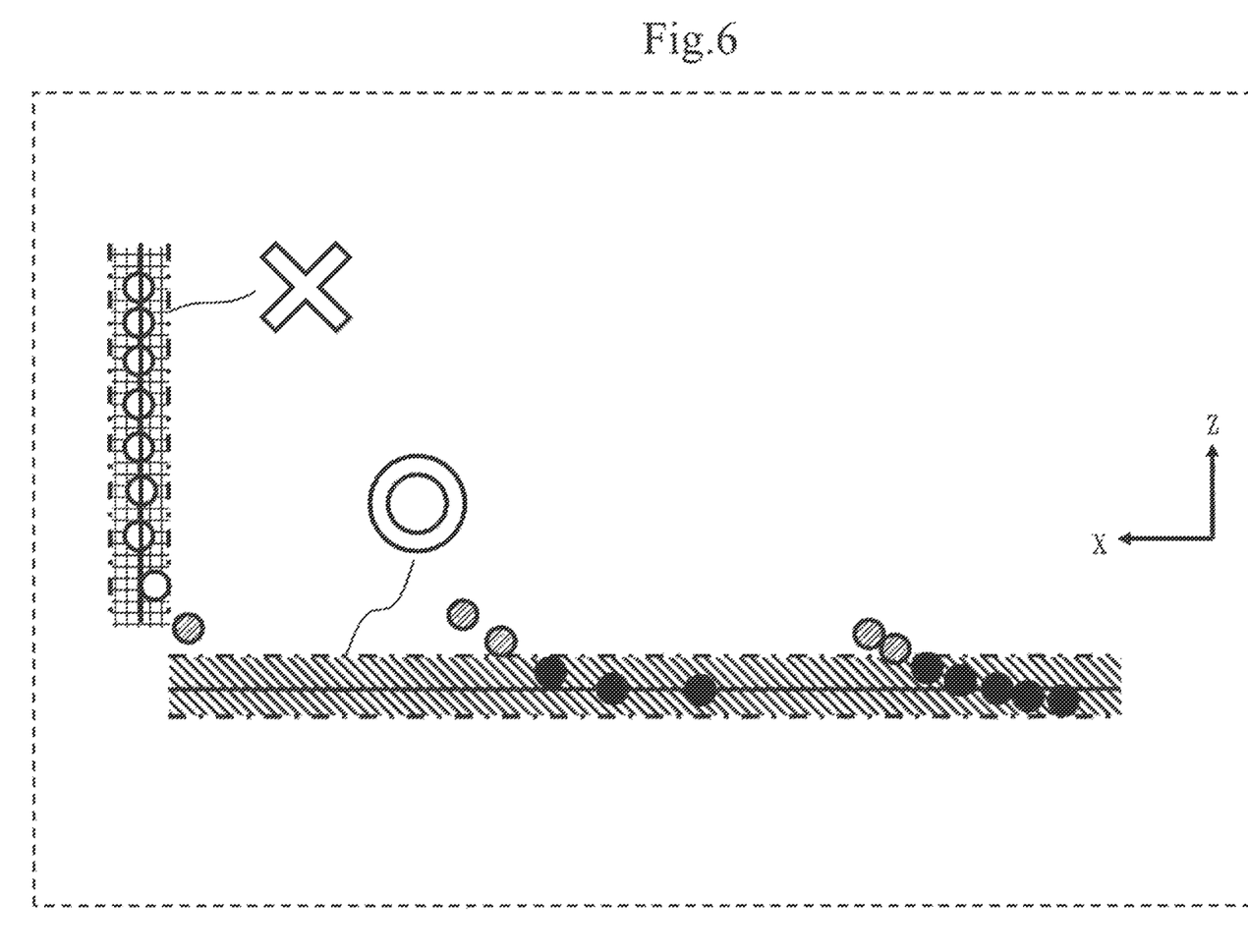
FIG. 6 is a concept diagram illustrating processing of a pseudo water surface detection unit 32 according to Embodiment 1.

FIG. 6 is a concept diagram illustrating a processing example of this step. In FIG. 6, reflection points 14 located in a vicinity of a plane determined by the pseudo water surface detection unit 32 as being a pseudo water surface are represented by black circles, and reflection points 14 corresponding to a plane determined by the pseudo water surface detection unit 32 as not being a pseudo water surface are represented by white circles.

The pseudo water surface
is a plane for obtaining the water surface 10, and
is typically a horizontal plane, or a close-to-horizontal plane extending through a relatively low portion of the water surface 10.

The pseudo water surface detection unit 32 detects a pseudo water surface corresponding to the water surface 10, from the plane corresponding to the point cloud data generated in step S1.

The three-dimensional LiDAR 2 cannot detect an obstacle 13 in the water through the water surface 10 except a case where, for example, the laser light 12 hits the water surface 10 of highly transparent water at an angle close to perpendicular to the water surface 10.

The pseudo water surface detection unit 32
determines whether or not each plane detected in step S1 is a pseudo water surface on the basis of a deviation from the horizontal, a height, and so on of the plane, and detects point cloud data $P_{w,v}$ located in the vicinity of the pseudo water surface, and
removes $P_{w,v}$ from P.

$P_{w,v}$ is formed of the reflection points 14 on the water surface 10. Point cloud data obtained by removing $P_{w,v}$ from P is sometimes called upper point cloud data.

The pseudo water surface detection unit 32
selects one plane detected in step S1,
calculates an angle formed by a height direction (z-direction) in the local coordinate system illustrated in FIG. 2 and a normal to the selected plane, as a degree of deviation of the plane from the horizontal, and
takes the selected plane as a candidate of the pseudo water surface when the calculated angle is equal to or smaller than a tilt threshold value.

The tilt threshold value may be any value. In a specific example, the tilt threshold value may be a fixed value, or a variable value that depends on the tilt of the floating body 11 or the like. In the following, the same applies w % ben mentioning a threshold value, unless otherwise noted, even if the threshold value is of a different type.

Not all points belonging to $P_v(l)$ exist on one plane necessarily.

If the plane detected in step S1 may be horizontal or close to horizontal, sometimes it is not a pseudo water surface but is an upper surface of an object floating on the water, an upper surface of a pier, or the like. Hence, the pseudo water surface detection unit 32 determines whether the plane is a pseudo water surface or not on the basis of the height of the plane.

In a specific example, the pseudo water surface detection unit 32 extracts $P_{w,v}$ by, for example: determining, as a pseudo water surface, a plane when a height of point cloud data corresponding to the plane is lower than a plane threshold value which is a predetermined threshold value; and by determining, as a pseudo water surface, point cloud data with the smallest height, among a plurality of groups of point cloud data. The height of the point cloud data is, in a specific example, an average of heights of all points belonging to the point cloud data corresponding to the plane, or a height of the tallest point or the lowest point, among the points belonging to the point cloud data. In the following, the same applies when mentioning a height of point cloud data, unless otherwise noted.

If a plane that satisfies this condition does not exist, the pseudo water surface detection unit 32 may determine that $P_{w,v}$ does not exist.

Taking into account the fact that the three-dimensional LiDAR 2 is installed on the floating body 11, it is desirable to set a maximum value of a swing angle of the floating body 11 in an environment where it is used, as the threshold value of the angle formed by the height direction (z-direction) and the normal to the plane. The maximum value of the swing angle is, in a specific example, a value being preset in advance or a value being calculated on the basis of an actual measurement value, and may be a variable value.

The pseudo water surface detection unit 32
determines points located within a predetermined range above and below the pseudo water surface, as the reflection points 14 on the water surface 10, and
separates P into $P_{w,v}$ and point cloud data $P_{r,2}$ which is formed of points obtained by removing $P_{w,v}$ from P.

The pseudo water surface detection unit 32 may change the predetermined range above and below the pseudo water surface, taking a condition of the water surface or the like into account.

In subsequent processes, the obstacle detection device 3 removes point cloud data on the water surface 10 which forms a wave surface, and/or point cloud data which is on the water surface 10 and attaching to the obstacle 13, both point cloud data being left as they were not determined as reflection points 14 on the water surface 10.

(Step S3: Grouping Process)

Figure 7:
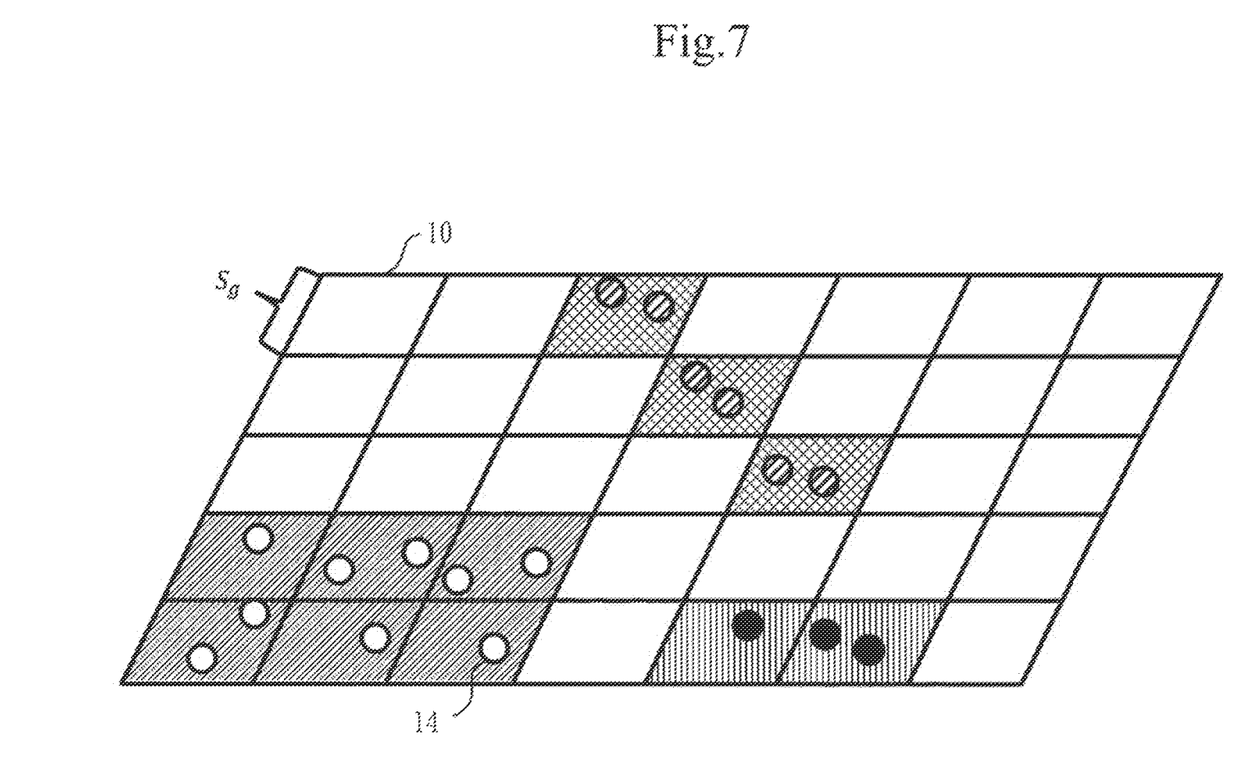
FIG. 7 is a concept diagram illustrating processing of a grouping unit 33 according to Embodiment 1.

The grouping unit 33 executes a pre-process for extracting a wave peak.

The grouping unit 33 generates point cloud data $P_b(m)$ ($1 \le m$) formed of points included in $P_{r,2}$, by connecting points that are at short distances from each other. Each $P_b(m)$ will be called a "point cloud group". In the following, assume that M pieces of point cloud groups are generated in this step.

The grouping unit 33
may connect the points in any manner such as, for example, generating point sets each by putting together a plurality of points belonging to $P_{r,2}$ and connecting sets that are at short distances from each other, and
may employ any definition as a definition of a distance and as a determination criterion of whether points are close to each other or not.

FIG. 7 is a concept diagram illustrating an example of a processing result of step S3.

In this example, the grouping unit 33 divides a plane perpendicular to the height direction of the local coordinate system illustrated in FIG. 2, into square sections each having a side with a length of $S_g$, and connects the sections with each other until no points exist in adjacent sections.

The grouping unit 33 may divide the plane using one or more types of polygons, instead of dividing the plane using square sections 15. The grouping unit 33 may divide a predetermined range above and below the plane with using rectangular parallelepiped sections, or using one or more types of solid figures.

$P_b(m)$ may be formed only of points belonging to one section.

(Step S4: Wave Peak Detection Process)

Figure 8:
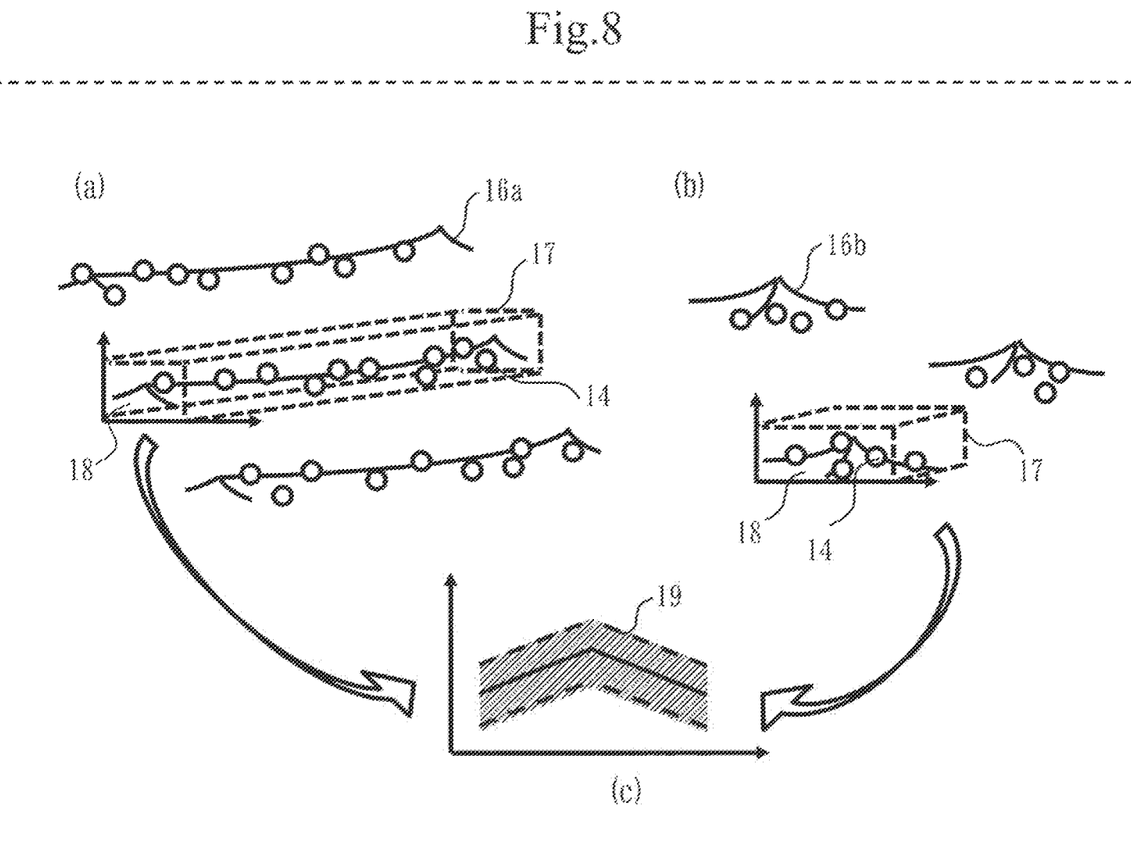
FIG. 8 is a diagram illustrating examples of a wave peak 16 to be detected by a wave peak detection unit 34 according to Embodiment 1, in which (a) illustrates a feature of a wave peak 16a which forms a linearly long wave, (b) illustrates a feature of a wave peak 16b which forms a pyramidal wave generated by synthesis of waves coming from a plurality of directions, and (c) illustrates a wave peak model 19 expressed by statistic.

When the water surface 10 waves, the pseudo water surface detection unit 32 sometimes does not include, in $P_{w,v}$, a reflection point 14 which is in contact with a wave peak 16. The wave peak 16 refers to a portion obtained by removing a relatively low portion from a wave on the water surface 10.

The wave peak detection unit 34 detects the wave peak 16 with utilizing fitting to a wave peak model 19. The wave peak model 19 is an abstract model of the wave peak 16.

A height of a point cloud group is determined in the same manner as the height of the point cloud data is.

The wave peak detection unit 34 detects the reflection points 14 on the wave peak 16 from each $P_b(m)$.

FIG. 8 is a diagram illustrating examples of the wave peak 16 to be detected by the wave peak detection unit 34, in which white circles represent points in a point cloud group. Note that (a) of FIG. 8 illustrates an example of a feature of a wave peak 16a which forms a linearly long wave, (b) of FIG. 8 illustrates an example of a feature of a wave peak 16b which forms a pyramidal wave generated by synthesis of waves coming from a plurality of directions, and (c) of FIG. 8 illustrates an example of a wave peak model 19 expressed by statistic such as an average and a variance. The wave peak model 19 may be formed by another method.

The storage unit 3b stores at least one wave peak model 19. The wave peak detection unit 34 extracts the wave peak 16 having a shape as illustrated in, for example, (a) of FIG. 8 or (b) of FIG. 8, by determining whether the wave peak 16 fits the wave peak model 19.

In a specific example, the wave peak detection unit 34
generates a circumscribed rectangular parallelepiped 17 using planes perpendicular to the height direction,
projects points in the circumscribed rectangular parallelepiped 17 onto a plane 18 perpendicular to a direction of a long side of a circumscribed quadrangle, and
determines $P_b(m)$ as a wave peak 16 when the projected points can be fitted to a gentle-sloped bell-shape wave peak model 19.

In the following, note that in this step, the wave peak detection unit 34 determines $M_t$ pieces of $P_b(m)$ as being wave peaks 16.

The wave peak detection unit 34 takes into account the fact that a point cloud group at a high position is highly unlikely to represent reflection points 14 of the water surface 10, and extracts a wave peak having a height estimated to represent a wave.

The wave peak detection unit 34 finds a barycentric position $P_{g,t}(m)$ of each $P_b(m)$ that has been determined to fit the wave peak model 19.

The wave peak detection unit 34
executes a following process (A) if $P_{w,v}$ exists, and
otherwise executes a following process (B).

Process (A)
The wave peak detection unit 34
determines $P_b(m)$ as the wave peak 16 if a distance between a plane corresponding to $P_{w,v}$ and $P_{g,t}(m)$ is equal to or smaller than a water surface threshold value, and
takes each $P_b(m)$ determined as the wave peak 16, to be a point cloud group $P_{w,t}(m_t)$ ($1 \leq m_t \leq M_t$), and takes each of the other $P_b(m)$ to be a point cloud group $P_{b,r}(m_r)$ ($1 \leq m_r \leq M_r$, $M_t + M_r = M$).

Process (B)
if $P_{w,v}$ does not exist, the wave peak detection unit 34, instead of executing the process (A),
finds barycentric positions $P_{g,b}(m)$ of all points included in each $P_b(m)$ determined not to fit the wave peak model 19, that is, included in each $P_b(m)$ determined as not being reflection points 14 on the wave peak 16 nor reflection points 14 on the water surface 10, and takes a lowest height of $P_{g,b}(m)$ among all $P_{g,b}(m)$, as the water surface threshold value, and
finds barycentric positions $P_{g,t}(m)$ of all points included in each $P_b(m)$ determined to fit the wave peak model 19, takes each $P_b(m)$ corresponding to each $P_{g,t}(m)$ with a height equal to or smaller than the water surface threshold value, as a point cloud group $P_{w,t}(m_t)$, and takes each of the other $P_b(m)$, as $P_{b,r}(m_r)$.

(Step S5: Boundary Detection Process)

Figure 9:
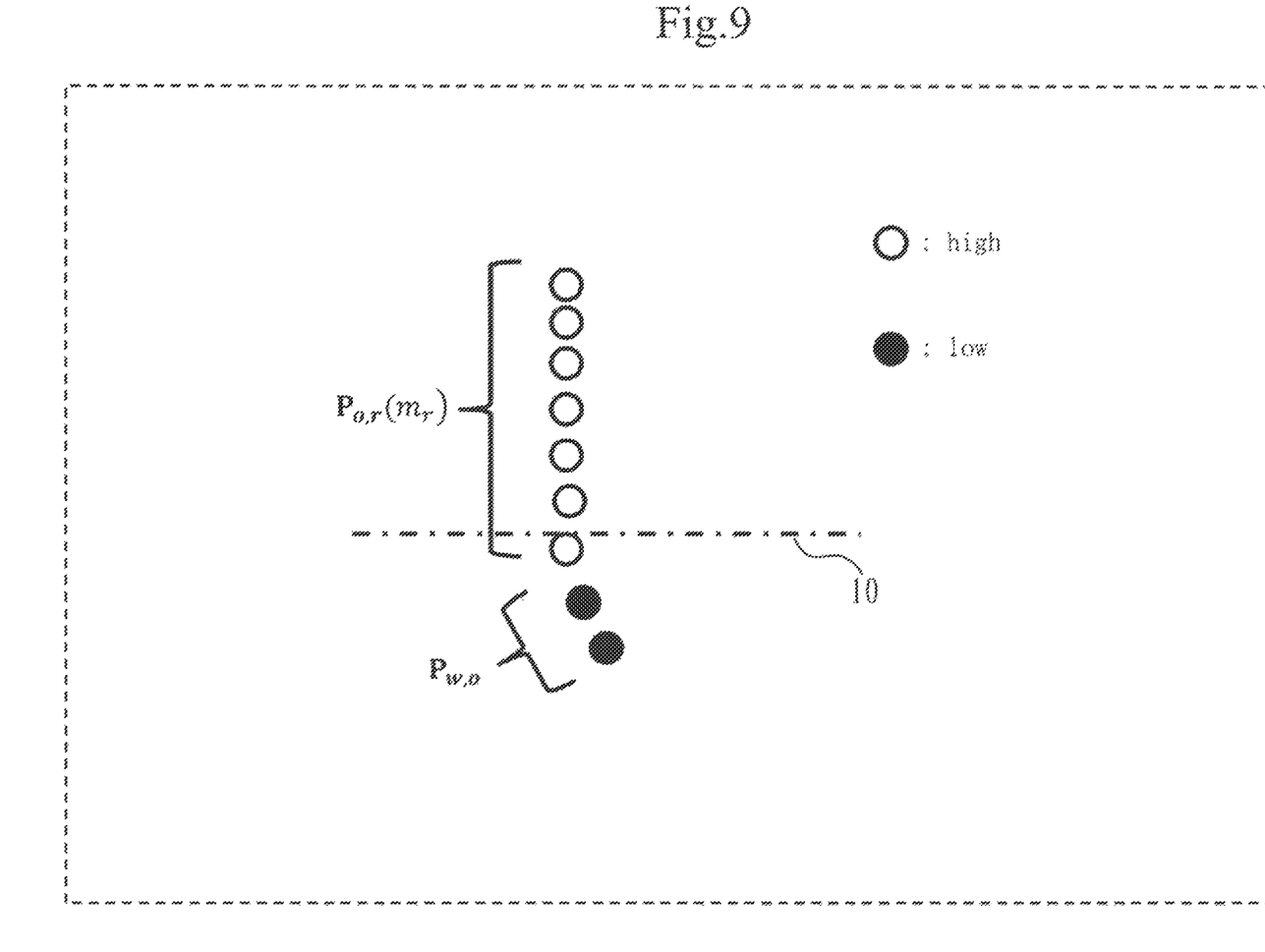
FIG. 9 is a concept diagram illustrating a processing example of a boundary detection unit 35 according to Embodiment 1.

The boundary detection unit 35 removes point data corresponding to the reflection points 14 which exist on the water surface 10 and are included in $P_{b,r}(m_r)$, so as to extract reflection points 14 which are not determined as being on the water surface by the pseudo water surface detection unit 32 and wave peak detection unit 34 because they attach to or exist along the obstacle 13, and yet which are assumed to be on the water surface 10.

In this step, the boundary detection unit 35 utilizes the fact that I(k) of the reflection points 14 on the water surface 10 is small.

The boundary detection unit 35 may extract the reflection points 14 on the obstacle 13.

Sometimes $P_{b,r}(m_r)$ includes part of the water surface 10 because, for example, the water surface 10 near the boundary between the obstacle 13 and the water surface 10 tends to swell.

With only the processes up to step S4, in a case where the reflection points 14 on the water surface 10 are included in $P_{b,r}(m_r)$, a shape of the same obstacle 13 may possibly differ between frames. Then, detection accuracy of the obstacle 13, a quality of a point cloud group corresponding to the obstacle 13, and so on may degrade.

In view of this, the boundary detection unit 35 determines points having a low reflection intensity among points included in $P_{b,r}(m_r)$, as part of the water surface 10.

FIG. 9 is a concept diagram illustrating a processing example of the boundary detection unit 35. In FIG. 9, white circles represent points having a high reflection intensity, and black circles represent points having a low reflection intensity.

Typically, about all $m_r$, the boundary detection unit 35 removes the reflection points 14 included in $P_{b,r}(m_r)$ and having a low reflection intensity which is equal to or smaller than a predetermined threshold value, from $P_{b,r}(m_r)$.

Typically, the boundary detection unit 35
finds an average value of the reflection intensities of all points included in $P_{b,r}(m_r)$, as an average reflection intensity $l_{b,r}(m_r)$, and
about all points included in $P_{b,r}(m_r)$, when a reflection intensity I(k) which corresponds to a point and which is acquired together with position information of the point by the three-dimensional LiDAR 2 is equal to or smaller than a reflection threshold value which is a value sufficiently smaller than $I_{b,r}(m_r)$, the boundary detection unit 35 extracts this point as a boundary reflection point. The boundary reflection point is a point determined as a reflection point 14 on the water surface 10 by the boundary detection unit 35.

The reflection threshold value may be a variable value that depends on the weather or the like.

If $P_{w,v}$ exists, when, about all boundary reflection points, in a case where a distance between a plane corresponding to $P_{w,v}$ and the boundary reflection point is equal to or smaller than a boundary water surface threshold value, the boundary detection unit 35 determines the boundary reflection point as a point on the water surface 10, in the same manner as in the process (A) of the wave peak detection unit 34, and removes this point from $P_{b,r}(m_r)$. The boundary water surface threshold value may be the same as the water surface threshold value.

If $P_{w,v}$ does not exist, the boundary detection unit 35 finds a water surface threshold value, in the same manner as in the process (B) of the wave peak detection unit 34, determines, as a point on the water surface 10, a boundary reflection point located at a height equal to or smaller than the water surface threshold value, and removes this point from $P_{b,r}(m_r)$.

The boundary detection unit 35, about all $m_r$, takes point cloud data obtained by removing the points on the water surface 10 from $P_{b,r}(m_r)$, as point cloud data $P_{o,r}(m_r)$, and takes point cloud data formed of all points on the water surface 10 that have been removed in this step, as point cloud data $P_{w,o}$.

Accordingly, the point cloud data $P_w$ formed of the reflection points 14 on the water surface 10 is data generated by connecting $P_{w,v}$, $P_{w,t}(m_t)$, and $P_{w,o}$, and point cloud data $P_o$ formed of the reflection points 14 on the obstacle 13 is data generated by connecting all $P_{o,r}(m_r)$.

The obstacle detection unit 3e
uses the point cloud data $P_o$ which has been separated by the water surface separation unit 3d from the point cloud data constituting one frame and which is formed of the reflection points 14 on the obstacle 13, or uses the point cloud data $P_{o,r}(m_r)$ of individual obstacles 13, to perform a process concerning detection of the obstacle 13 within the measurement range of the three-dimensional LiDAR 2, and
transmits a processing result to the display device 4 via the input/output unit 3a.

The obstacle detection unit 3e, in a specific example, executes processes such as identification of the obstacle 13 by fitting with a pier model and/or a vessel model stored in the storage unit 3b, and calculation of a speed of a moving obstacle 13 by tracing the moving obstacle 13 with using inter-frame similarity search which utilizes a shape feature amount of a point cloud.

Characteristic of Embodiment 1

An obstacle detection device 3
receives information on observation point cloud data formed of a plurality of reflection points observed within a measurement range including a water surface 10, the information including position information of each reflection point,
and is provided with
a plane detection unit 31 to detect planes extending near a plurality of reflection points included in the observation point cloud data,
a pseudo water surface detection unit 32 to detect a pseudo water surface which is a plane detected by the plane detection unit 31 and extending through a relatively low portion of the water surface 10,
a wave peak detection unit 34 to detect a reflection point corresponding to a wave peak 16, from upper point cloud data, the wave peak 16 being formed of the water surface 10 excluding a relatively low portion of a wave of the water surface 10, the upper point cloud data being formed of reflection points obtained by removing reflection points corresponding to the pseudo water surface from the reflection points included in the observation point cloud data, and
an obstacle detection unit 3e to take the reflection points corresponding to the pseudo water surface and the reflection point corresponding to the wave peak 16, as reflection points included in water surface point cloud data, and to determine a reflection point included in the observation point cloud data and not included in the water surface point cloud data, as a reflection point of an obstacle.

The plane detection unit 31 detects a plane by utilizing fitting to a plane model.

When a tilt of a normal to the plane detected by the plane detection unit 31 with respect to a height direction of the obstacle detection device 3 is equal to or smaller than a tilt threshold angle, and a height of the detected plane is equal to or smaller than a plane threshold value, the pseudo water surface detection unit 32 determines the plane as the pseudo water surface.

The obstacle detection device 3 is provided with a storage unit 3b which stores a wave peak model 19 expressing the wave peak 16, and
the wave peak detection unit 34 determines a portion of the upper point cloud data that can be fitted to the wave peak model 19, as the wave peak 16.

The obstacle detection device 3 is provided with a grouping unit which divides the measurement range with using figures, and when each of two figures adjacent in a horizontal direction includes a reflection point included in the upper point cloud data, connects the two figures into one connective figure and groups reflection points included in the one connective figure to form one point cloud group, and
the wave peak detection unit 34 determines, for each point cloud group, whether or not there exists a reflection point corresponding to a wave peak 16.

The wave peak detection unit 34 finds a barycentric position of each point cloud group, and when a distance between the found barycentric position and the pseudo water surface is equal to or smaller than a water surface threshold value, determines a reflection point included in a point cloud group corresponding to the found barycentric position, as being a reflection point corresponding to the wave peak 16.

The obstacle detection device 3 receives information on a reflection intensity of each reflection point,
and is provided with a boundary detection unit 35 which detects, as a boundary reflection point, a reflection point located on a water surface 10 near a boundary between the water surface 10 and an obstacle on the water surface 10, from among reflection points obtained by removing the reflection points corresponding to the pseudo water surface and the reflection point corresponding to the wave peak 16, from the observation point cloud data, with utilizing the reflection intensity.

wherein the obstacle detection unit 3e takes the boundary reflection point as a reflection point included in the water surface cloud data.

The boundary detection unit 35 determines, as the boundary reflection point, a reflection point whose boundary reflection point height is equal to or smaller than a boundary water surface threshold value.

The boundary detection unit 35 determines, as the boundary reflection point, a reflection point which is a boundary reflection point at a height equal to or smaller than a boundary water surface threshold value.

Description of Effect of Embodiment 1

Conventionally, in detection of an obstacle on a water surface, on the basis of knowledge that a detection target of a three-dimensional LiDAR is located at a position higher than a wave on the sea, it is estimated that a maximum height of the wave is sufficiently smaller than that of the detection target, and a threshold value is set. Point data from a position lower than the threshold value is excluded as point data from the water surface. Hence, it is difficult to apply the conventional technique to a small-size vehicle which must detect an object having almost the same height as a height of the wave and which must perform operations such as avoidance and/or approaching to the coast, and the like.

According to the present embodiment, the pseudo water surface determination process S2 and the wave peak detection unit 34 detect the reflection point 14 on the water surface 10 or on the wave peak 16 from the point cloud data acquired from the three-dimensional LiDAR 2, by fitting the reflection point 14 to the wave peak model 19, and the pseudo water surface determination process S2 selects point cloud data located at the lowest position in the height direction, on the basis of the fact that laser light emitted by the three-dimensional LiDAR 2 is not easily transmitted through the water surface 10.

Therefore, according to the present embodiment, even if the height of the obstacle 13 being a detection target and a height of the wave are almost the same, the reflection point 14 on the obstacle 13 on the water surface 10 and the reflection point 14 on the water surface 10 can be discriminated from each other.

Furthermore, according to the present embodiment, near the obstacle 13, the boundary detection unit 35 determines the reflection point 14 whose reflection intensity is the reflection threshold value, as a reflection point on the water surface 10. Thus, detection accuracy of the obstacle 13 can be enhanced.

<Modification 1>

The obstacle detection device 3 may be formed of a plurality of computers.

<Modification 2>

The obstacle detection device 3 may receive point cloud data from an apparatus other than the three-dimensional LiDAR 2.

In the present modification, in a specific example, the obstacle detection device 3 receives point cloud data from a depth camera.

<Modification 3>

The water surface 10 can be a surface of a liquid other than water.

<Modification 4>

The obstacle detection device 3 may receive point cloud data P.

In the present modification, the obstacle detection device 3 may not be necessarily provided with a coordinate transformation unit 3c.

<Modification 5>

The floating body 11 can be an apparatus fixed to a bank or the like, or may be an apparatus flying near the water surface 10.

<Modification 6>

The plane detection unit 31 need not take restrictions concerning coefficients indicated in (Expression 4) into account.

<Modification 7>

If a pseudo water surface does not exist in step S2, the obstacle detection device 3 may return to step S1.

<Modification 8>

The obstacle detection device 3 may learn and/or generate the wave peak model 19 on the basis of observation data or the like.

<Modification 9>

If the obstacle detection device 3 can find a vertical direction in step S2, the pseudo water surface detection unit 32 may detect the pseudo water surface on the basis of an angle from the vertical direction.

<Modification 10>

In step S4, the wave peak detection unit 34 may take a position other than a strict barycentric position as the barycentric position.

<Modification 11>

The obstacle detection device 3 may not be necessarily provided with a boundary detection unit 35.

In the present modification, the obstacle detection device 3 takes the reflection point 14 corresponding to the pseudo water surface and the reflection point 14 corresponding to the wave peak, as water surface point cloud data.

<Modification 12>

In step S5, the boundary detection unit 35 may not necessarily determine whether reflection intensities of all points are equal to or smaller than the reflection threshold value.

In a specific example of the present modification, the boundary detection unit 35 extracts the reflection point 14 randomly. If an extracted point has a low reflection intensity, the boundary detection unit 35 checks a reflection intensity of a point near the extracted point.

<Modification 13>

In step S5, the boundary detection unit 35 may take $I_{b,r}(m_r)$ not as an average value of reflection intensities of all points included in $P_{b,r}(m_r)$, but as an average value of reflection intensities of some points included in $P_{b,r}(m_r)$.

In a specific example of the present modification, the boundary detection unit uses random sampling.

<Modification 14>

In the present embodiment, a case has been described where function constituent elements are implemented by software. However, in a modification, the function constituent elements may be implemented by hardware.

When the function constituent elements are implemented by hardware, the obstacle detection device 3 is provided with an electronic circuit 20 in place of the processor 5. Alternatively, although not illustrated, the obstacle detection device 3 is provided with an electronic circuit 20 in place of the processor 5, the memory 6, and the auxiliary storage device 21. The electronic circuit 20 is a dedicated electronic circuit that implements functions of the function constituent elements (and of the memory 6 and auxiliary storage device 21). The electronic circuit is sometimes referred to as a processing circuit as well.

The electronic circuit 20 may be a single circuit, a composite circuit, a programmed processor, a parallel-programmed processor, a logic IC, a Gate Array (GA), an Application Specific Integrated Circuit (ASIC), or a Field-Programmable Gate Array (FPGA).

The function constituent elements may be implemented by one electronic circuit 20. The function constituent elements may be implemented by a plurality of electronic circuits 20 through distribution.

Alternatively, some of the function constituent elements may be implemented by hardware, and the other function constituent elements may be implemented by software.

The processor 5, memory 6, auxiliary storage device 21, and electronic circuit mentioned above are collectively referred to as "processing circuitry". That is, the functions of the function constituent elements are implemented by processing circuitry.

Other Embodiments

It is possible to modify an arbitrary constituent element of Embodiment 1, or to omit an arbitrary constituent element in Embodiment 1.

The embodiment is not limited to what are described in Embodiment 1, and various changes can be made to Embodiment 1 as necessary.

REFERENCE SIGNS LIST

1: obstacle detection system; 2: three-dimensional LiDAR; 3: obstacle detection device; 4: display device; 3*a*: input/output unit; 3*b*: storage unit; 3*c*: coordinate transformation unit; 3*d*: water surface separation unit; 31: plane detection unit; 32: pseudo water surface detection unit; 33: grouping unit; 34: wave peak detection unit; 35: boundary detection unit; 3*e*: obstacle detection unit; 4*a*: input/output unit; 4*b*: operation unit. 4*c*: display unit; 5: processor; 6: memory; 7: sensor interface; 8: display interface; 9: setting interface; 10: water surface: 11: floating body; 12: laser light; 13: obstacle; 14: reflection point; 15: section; 16: wave peak; 16*a*: wave peak; 16*b*: wave peak; 17: circumscribed rectangular parallelepiped; 18: plane; 19: wave peak model; 20: electronic circuit; 21: auxiliary storage device; 22: data bus; 23: OS; 100: computer.

The invention claimed is:

1. An obstacle detection system comprising:
   a three-dimensional light detection and ranging (LiDAR) or a depth camera installed on a floating body to include a water surface as a measurement range, and configured to receive information on observation point cloud data formed of a plurality of reflection points observed within the measurement range including the water surface, the information including position information of each reflection point;
   processing circuitry
      to detect planes extending near a plurality of reflection points included in the observation point cloud data;
      to detect, as a pseudo water surface, a plane formed by reflection points that are positioned at a lowest height, among the plurality of reflection points within the observation point cloud data;
      to detect a reflection point corresponding to a wave peak, from upper point cloud data by grouping the plurality of reflection points into point cloud groups based on relative distances between the plurality of reflection points, identifying a point cloud group whose barycentric position is located at a distance from the pseudo water surface that is less than or equal to a water surface threshold and fits a wave peak model, and detecting the reflection point corresponding to the wave peak within the identified point cloud group, the wave peak being formed of the water surface excluding a relatively low portion of a wave of the water surface, the upper point cloud data being formed of reflection points obtained by removing reflection points corresponding to the pseudo water surface from the reflection points included in the observation point cloud data; and
   to take the reflection points corresponding to the pseudo water surface and the reflection point corresponding to the wave peak, as reflection points included in water surface point cloud data, and to determine a reflection point included in the observation point cloud data and not included in the water surface point cloud data, as a reflection point of an obstacle,
   wherein when a tilt of a normal to the detected plane with respect to a height direction of the obstacle detection system is equal to or smaller than a tilt threshold angle, and/or a height of the detected plane is equal to or smaller than a plane threshold value, the processing circuitry determines the plane as the pseudo water surface; and
a display configured to display a result of detecting the obstacle.

2. The obstacle detection system according to claim 1, wherein the processing circuitry detects a plane by utilizing fitting to a plane model.

3. The obstacle detection system according to claim 1, wherein the processing circuitry
   stores the wave peak model expressing the wave peak, and
   determines a portion of the upper point cloud data that can be fitted to the wave peak model, as the wave peak.

4. The obstacle detection system according to claim 1, wherein the processing circuitry
   divides the measurement range using figures, and when each of two figures adjacent in a horizontal direction includes a reflection point included in the upper point cloud data, connects the two figures into one connective figure and groups reflection points included in the one connective figure to form one point cloud group, and
   determines, for each point cloud group, whether or not there exists a reflection point corresponding to a wave peak.

5. The obstacle detection system according to claim 4, wherein the processing circuitry finds a barycentric position of each point cloud group, and when a distance between the found barycentric position and the pseudo water surface is equal to or smaller than a water surface threshold value, determines a reflection point included in a point cloud group corresponding to the found barycentric position, as being a reflection point corresponding to the wave peak.

6. The obstacle detection system according to claim 1, wherein the obstacle detection system receives information on a reflection intensity of each reflection point, and wherein the processing circuitry
detects, as a boundary reflection point, a reflection point located on a water surface near a boundary between the water surface and an obstacle on the water surface, from among reflection points obtained by removing the reflection points corresponding to the pseudo water surface and the reflection point corresponding to the wave peak, from the observation point cloud data, with utilizing the reflection intensity, and
takes the boundary reflection point as a reflection point included in the water surface cloud data.

7. The obstacle detection system according to claim 6,
wherein the processing circuitry determines, as the boundary reflection point, a reflection point whose reflection intensity is equal to or smaller than a reflection threshold value.

8. The obstacle detection system according to claim 6,
wherein the processing circuitry determines, as the boundary reflection point, a reflection point whose boundary reflection point height is equal to or smaller than a boundary water surface threshold value.

9. An obstacle detection method in an obstacle detection system, the obstacle detection method comprising:
installing a three-dimensional light detection and ranging (LiDAR) or a depth camera on a floating body to include a water surface as a measurement range, and configured to receive information on observation point cloud data formed of a plurality of reflection points observed within the measurement range including the water surface, the information including position information of each reflection point;
detecting planes extending near a plurality of reflection points included in the observation point cloud data;
detecting, as a pseudo water surface, a plane formed by reflection points that are positioned at a lowest height, among the plurality of reflection points within the observation point cloud data;
detecting a reflection point corresponding to a wave peak, from upper point cloud data, the wave peak being formed of the water surface excluding a relatively low portion of a wave of the water surface by grouping the plurality of reflection points into point cloud groups based on relative distances between the plurality of reflection points, identifying a point cloud group whose barycentric position is located at a distance from the pseudo water surface that is less than or equal to a water surface threshold and fits a wave peak model, and detecting the reflection point corresponding to the wave peak within the identified point cloud group, the upper point cloud data being formed of reflection points obtained by removing reflection points corresponding to the pseudo water surface from the reflection points included in the observation point cloud data;
taking the reflection points corresponding to the pseudo water surface and the reflection point corresponding to the wave peak, as reflection points included in water surface point cloud data, and determining a reflection point included in the observation point cloud data and not included in the water surface point cloud data, as a reflection point of an obstacle; and
displaying a result of detecting the obstacle,
wherein when a tilt of a normal to the detected plane with respect to a height direction of the obstacle detection system is equal to or smaller than a tilt threshold angle, and/or a height of the detected plane is equal to or smaller than a plane threshold value, the plane is determined as the pseudo water surface.

10. A non-transitory computer-readable recording medium recorded with an obstacle detection program that causes a computer to perform an obstacle detection method comprising:
installing a three-dimensional light detection and ranging (LiDAR) or a depth camera on a floating body to include a water surface as a measurement range, and configured to receive information on observation point cloud data formed of a plurality of reflection points observed within the measurement range including the water surface, the information including position information of each reflection point;
detecting planes extending near a plurality of reflection points included in the observation point cloud data;
detecting, as a pseudo water surface, a plane formed by reflection points that are positioned at a lowest height, among the plurality of reflection points within the observation point cloud data;
detecting a reflection point corresponding to a wave peak, from upper point cloud data by grouping the plurality of reflection points into point cloud groups based on relative distances between the plurality of reflection points, identifying a point cloud group whose barycentric position is located at a distance from the pseudo water surface that is less than or equal to a water surface threshold and fits a wave peak model, and detecting the reflection point corresponding to the wave peak within the identified point cloud group, the wave peak being formed of the water surface excluding a relatively low portion of a wave of the water surface, the upper point cloud data being formed of reflection points obtained by removing reflection points corresponding to the pseudo water surface from the reflection points included in the observation point cloud data;
taking the reflection points corresponding to the pseudo water surface and the reflection point corresponding to the wave peak, as reflection points included in water surface point cloud data, and to determine a reflection point included in the observation point cloud data and not included in the water surface point cloud data, as a reflection point of an obstacle; and
displaying a result of detecting the obstacle,
wherein when a tilt of a normal to the detected plane with respect to a height direction of the obstacle detection system is equal to or smaller than a tilt threshold angle, and/or a height of the detected plane is equal to or smaller than a plane threshold value, the plane is determined as the pseudo water surface.

* * * * *